US010634250B2

(12) United States Patent
Rasmussen et al.

(10) Patent No.: US 10,634,250 B2
(45) Date of Patent: Apr. 28, 2020

(54) NON-COLLAPSIBLE FLEXIBLE SEALING MEMBRANE AND SEAL ASSEMBLY FOR ROTARY SHAFT EQUIPMENT

(71) Applicant: John Crane Inc., Chicago, IL (US)

(72) Inventors: Darin Rasmussen, Palatine, IL (US); Tom Steigerwald, Chicago, IL (US); Syed Niamathullah, Morton Grove, IL (US); Dan Kozlowski, Naperville, IL (US); James R. Wasser, Lake Forest, IL (US); Michael G. Kalodimos, Morton Grove, IL (US)

(73) Assignee: JOHN CRANE INC., Chicago, IL (US)

( * ) Notice: Subject to any disclaimer, the term of this patent is extended or adjusted under 35 U.S.C. 154(b) by 0 days.

(21) Appl. No.: 15/648,350

(22) Filed: Jul. 12, 2017

(65) Prior Publication Data

US 2018/0017161 A1    Jan. 18, 2018

Related U.S. Application Data

(60) Provisional application No. 62/361,458, filed on Jul. 12, 2016.

(51) Int. Cl.
| | |
|---|---|
| *F16J 15/36* | (2006.01) |
| *F16J 15/00* | (2006.01) |
| *F16J 3/04* | (2006.01) |
| *F16J 15/32* | (2016.01) |

(52) U.S. Cl.
CPC ............. *F16J 15/002* (2013.01); *F16J 3/041* (2013.01); *F16J 15/32* (2013.01); *F16J 15/36* (2013.01)

(58) Field of Classification Search
CPC .. F16J 15/36; F16J 15/002; F16J 3/041; F16J 15/32
USPC .................................................. 277/377, 392
See application file for complete search history.

(56) References Cited

U.S. PATENT DOCUMENTS

| | | | | |
|---|---|---|---|---|
| 2,717,790 | A | * | 9/1955 | Chambers, Jr. .......... F16J 15/36 277/372 |
| 2,728,591 | A | * | 12/1955 | Solari ...................... F16J 15/36 277/392 |
| 2,752,176 | A | | 6/1956 | Ayling |

(Continued)

OTHER PUBLICATIONS

Search Report and Written Opinion dated Sep. 22, 2017 for PCT Application No. PCT/US2017/041769, 13 pages.

(Continued)

*Primary Examiner* — Eugene G Byrd
(74) *Attorney, Agent, or Firm* — Cantor Colburn LLP (57) ABSTRACT

A non-collapsible flexible sealing membrane (or bellows) for incorporation in a mechanical seal assembly and use in rotary shaft equipment. The sealing membrane includes a substantially radially outward extending first flange portion, which can be urged into an axially shiftable ring by a biasing mechanism. The sealing membrane further includes a substantially axially outboard extending second coaxial portion, substantially radially inward of the balance diameter of the seal. The horizontal portion is advantageously held fixed to a stub sleeve by an annular band. The angle between the vertical portion and the horizontal portion of sealing membrane enables directional control of the forces acting on stub sleeve and primary ring.

19 Claims, 5 Drawing Sheets

(56) References Cited

U.S. PATENT DOCUMENTS

| | | | | | |
|---|---|---|---|---|---|
| 2,853,020 | A | * | 9/1958 | Hollinger | F04C 27/009 277/366 |
| 2,995,391 | A | * | 8/1961 | Snyder | F16J 15/36 277/392 |
| 3,018,112 | A | * | 1/1962 | Amirault | F04D 29/126 277/372 |
| 4,355,827 | A | * | 10/1982 | Ehret | F16J 15/164 277/377 |
| 4,451,049 | A | | 5/1984 | Charhut | |
| 5,332,235 | A | * | 7/1994 | Fone | F16J 15/36 277/380 |
| 5,375,852 | A | * | 12/1994 | Charhut | F16J 15/3404 277/371 |
| 5,529,315 | A | * | 6/1996 | Borrino | F16J 15/004 277/352 |
| 5,713,576 | A | * | 2/1998 | Wasser | F16J 15/3404 277/304 |
| 5,725,219 | A | | 3/1998 | Gilbert | |
| 5,797,602 | A | * | 8/1998 | Less | F16J 15/348 277/372 |
| 5,893,564 | A | * | 4/1999 | Yang | F16J 15/348 277/374 |
| 6,145,841 | A | * | 11/2000 | Maeda | F16J 15/348 277/358 |
| 6,220,601 | B1 | * | 4/2001 | Keller | F16J 15/36 277/381 |
| 6,655,694 | B1 | * | 12/2003 | Nakano | F16J 15/36 277/370 |
| 7,431,303 | B2 | * | 10/2008 | Dahlheimer | F04D 29/126 277/359 |
| 8,955,848 | B2 | * | 2/2015 | Roddis | F16J 15/348 277/370 |
| 9,581,248 | B2 | * | 2/2017 | Itadani | F16J 15/34 |
| 9,746,083 | B2 | * | 8/2017 | Borasso | F16J 15/36 |
| 2002/0074732 | A1 | | 6/2002 | Burroughs | |
| 2016/0097456 | A1 | | 4/2016 | FitzGibbon et al. | |
| 2016/0230892 | A1 | * | 8/2016 | Yoshino | F04D 29/128 |

OTHER PUBLICATIONS

International Preliminary Report on Patentability dated Jul. 30, 2018 for PCT Application No. PCT/US17/41769, 23 pages.
"Mechanical Seals for Pumps: Application Guidelines", published by Hydraulic Institute, Parsippany, New Jersey, 2006, 16 pages.

* cited by examiner

NON-COLLAPSIBLE FLEXIBLE SEALING MEMBRANE AND SEAL ASSEMBLY FOR ROTARY SHAFT EQUIPMENT

RELATED APPLICATION

The present application claims the benefit of U.S. Provisional Application No. 62/361,458 filed Jul. 12, 2016, which is hereby incorporated herein in its entirety by reference.

TECHNICAL FIELD

This invention relates to rotary shaft equipment having mechanical seal assemblies providing a seal between a housing and rotatable shaft of the rotary shaft equipment. More particularly, it relates to such rotary shaft equipment and seal assemblies that include a secondary sealing membrane such as a bellows.

BACKGROUND

Mechanical seals are used to provide a seal between a rotating shaft and a stationary housing of a pump, compressor, turbine, or other rotating machine. End face mechanical seals generally include a primary seal interface comprising two relatively rotatable seal faces. Frictional wear between the seal faces can cause a gap to form therebetween, leading to excessive leakage. Accordingly, some end face seals require regular adjustment in order to maintain the appropriate or axial position of an axially shiftable seal member (also known as "seal height") in order to account for such wear.

Various biasing mechanisms have been contemplated to provide a closing force to automatically accommodate wear. Such biasing mechanism have included single and multiple coil springs, and metal bellows.

Pusher seal assemblies comprise a dynamic secondary seal (such as an o-ring) to provide a seal between the shaft and the seal members themselves. The dynamic secondary seal of pusher seals is generally configured to move axially with the axially shiftable seal member. This axial movement relative to the shaft can cause fretting or shredding of the secondary seal due to friction.

Figure 1:
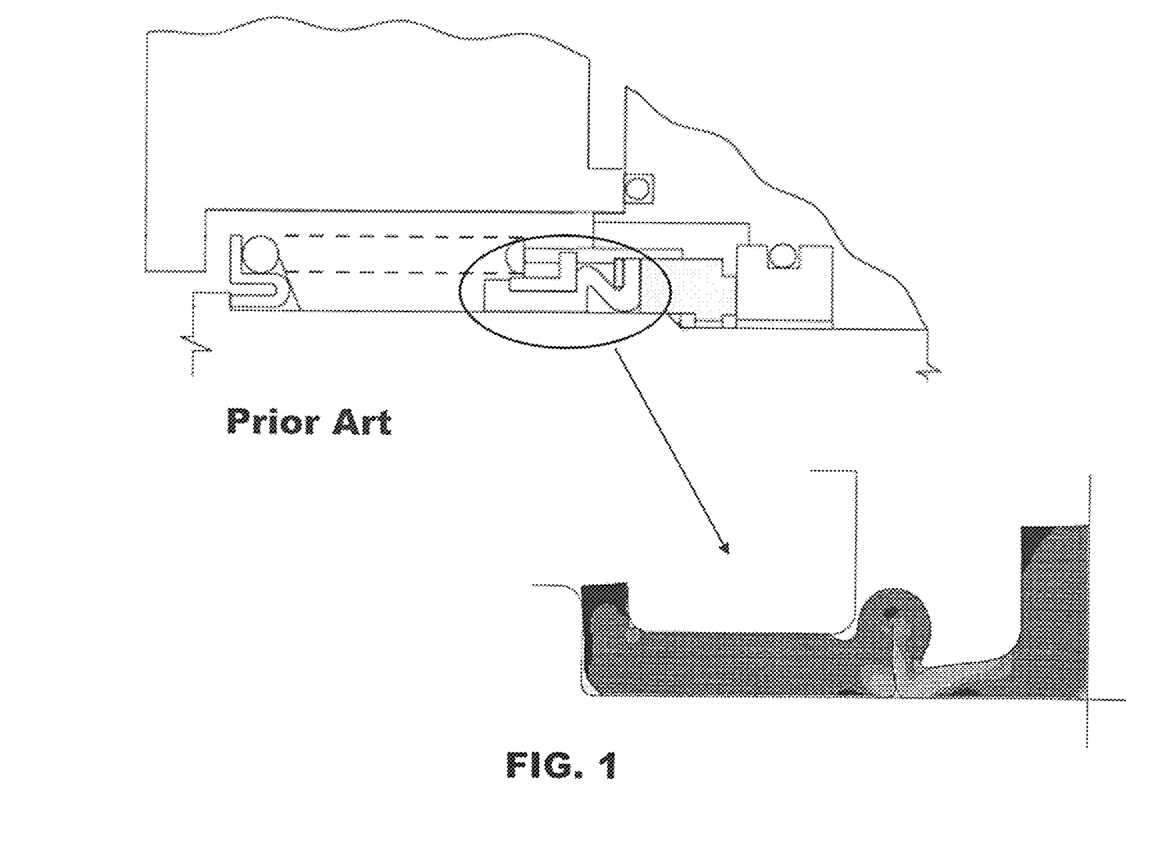
FIG. 1 is a cross-sectional view depicting a portion of a seal assembly and detail of an elastomeric bellows as is known in the art.

Non-pusher seals generally feature a secondary shaft seal that is not intended to move axially relative to the shaft, such as an o-ring (generally used with metallic bellows seals), or an elastomeric bellows, an example of which is provided in FIG. 1. The depicted mechanical seal comprises an elastomeric bellows that is driven to rotate with the shaft relative to the housing. This non-pusher seal can reduce torque stress on the bellows, which are intended to contract and expand to balance the opening and closing forces on the seal faces. At high pressures, such as gauge pressures above about 70 bar(g), however, the shaft itself can translate axially. This can create an axial load on the elastomeric bellows which can cause the elastomer to rigidly collapse, as shown in the detail view (where lighter areas are those with higher pressure). This axial rigidity prevents the bellows from effectively counteracting the closing force provided by the biasing members, leading to excess face pressure, frictional wear, and eventual seal failure.

Ongoing demand for improved productivity, reliability, durability and changing envelope requirements for pumps and other rotary shaft equipment dictate continued effort for new developments in seal assemblies. In particular, a need exists for mechanical seals that can operate to seal higher internal pressures. The present disclosure relates to an advance in seal technology that addresses these needs.

SUMMARY

Embodiments of the present disclosure meet the need for mechanical seals that can operate to seal higher internal pressures by providing a non-collapsible flexible sealing membrane (or bellows) for incorporation in a mechanical seal assembly and use in rotary shaft equipment.

The flexible sealing membrane includes a first, substantially radially extending portion, which can be urged into an axially shiftable ring by seal components including a plurality of axially spaced springs. The flexible sealing membrane further includes a second, substantially axially extending portion, substantially radially inward of the balance diameter of the seal, and oriented generally orthogonally to the first portion. The second portion is advantageously held fixed to a stub sleeve by an annular band. The angle between the first portion and the second portion of sealing membrane can provide for directional control of the forces acting on the stub sleeve. The flexible sealing membrane can reduce the effects on seal performance caused by axial shifting of the rotating shaft at high pressures.

In an embodiment, a mechanical seal assembly is adapted for arrangement around a rotating shaft and comprises an axially shiftable seal ring arranged axially outboard of a axially-fixed seal ring, and a flexible sealing membrane. The flexible sealing member can include a flange portion arrangable between the axially shiftable seal ring and a biasing mechanism, the flange portion being axially shiftable relative to the rotating shaft by forces transmitted to the flange portion by the biasing mechanism and the axially shiftable seal ring. The flexible sealing member can further include a coaxial portion extending axially from a flexible connection portion at a radially inward extent of the flange portion. The coaxial portion can be held axially fixed relative to the rotating shaft by an annular band at an outer diameter and an annular stub sleeve at an inner diameter whereby the closing force applied to the stationary seal ring by the flange portion remains fixed regardless of the axial position of the flange portion.

In embodiments, the coaxial portion is arrangable at a diameter within the balance diameter of the seal and the connecting portion presents a thinner cross section than the flange portion and the coaxial portion.

In an embodiment, axially inboard directed forces (such as the inward translation of the rotating shaft) urge the flange portion to shift axially inboard and radially inward relative to the coaxial portion and axially outboard directed forces (such as the outward translation of the rotating shaft) urge the flange portion to shift axially outboard and radially outward relative to the coaxial portion.

In an embodiment, the mechanical seal system further comprises an anti-extrusion ring receivable within a groove of the axially shiftable seal ring.

In an embodiment, the stub sleeve is axially fixed to the biasing mechanism by a snap ring.

In an embodiment, the biasing mechanism comprises an axially shiftable annular retainer proximate the flange portion, an annular carrier, axially fixed to a gland plate, and a plurality of radially spaced spring members arranged therebetween.

In an embodiment, a rotating sleeve is operably coupled to the rotating shaft for rotation therewith and the axially fixed seal ring is operably coupled to the sleeve by a plurality of pins.

In an embodiment, an annular flexible sealing membrane is adapted for arrangement within a mechanical seal assembly, and comprises a coaxial portion including a radially inboard directed face, an axially outboard directed face, and a radially outward directed face. The member further comprises an axially shiftable flange portion extending radially outward from the coaxial portion and including an axially inboard directed face, a radially outward directed face, and an axially outboard directed face. In an embodiment, the axially outboard directed face of the flange portion is coupled to the radially outward directed face of the coaxial portion by a flexible connecting portion comprising an axially inboard and radially inward facing facet. The facet can include a first segment extending axially outboard from the axially inboard directed face of the flange portion and a second segment extending axially outboard and radially inward from the first segment to the radially inboard directed face of the coaxial portion.

In an embodiment, the sealing membrane comprises a flexible elastomer.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

Figure 2:
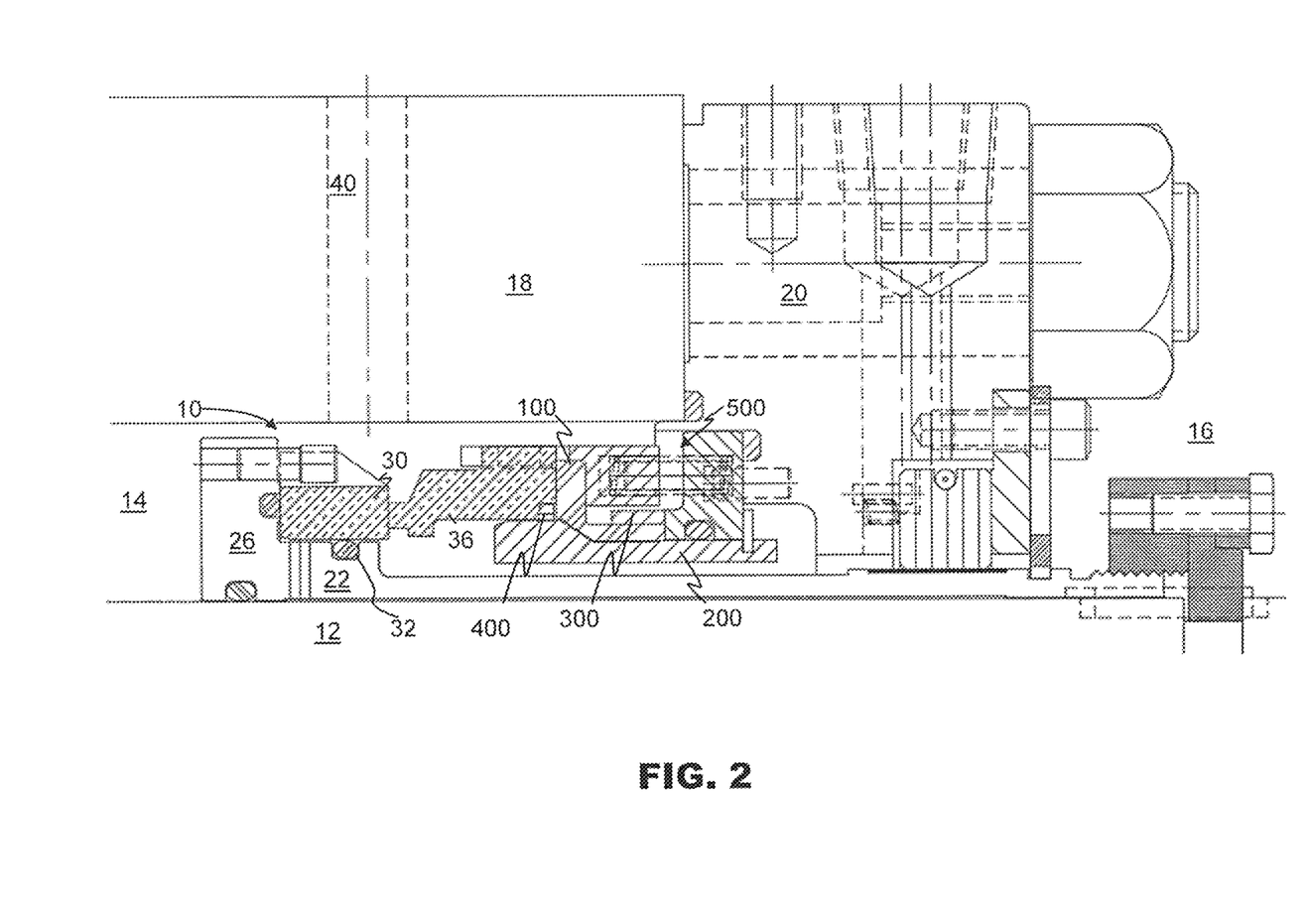
FIG. 2 is a cross-sectional view depicting a portion of a seal assembly according to an embodiment.
Figure 3:
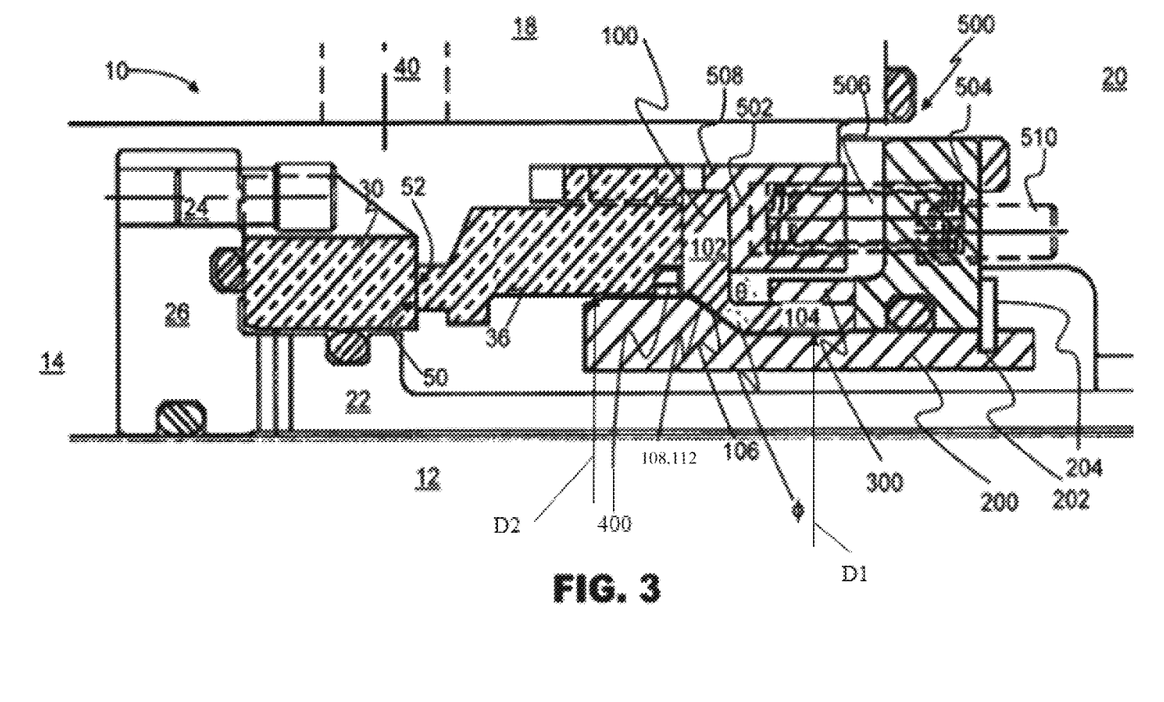
FIG. 3 is a cross-sectional view depicting a detail of the seal assembly of FIG. 2 according to an embodiment.

FIGS. 2 and 3 are broad and detail (respectively) cross-sectional views depicting a portion of a seal assembly 10 including a flexible, non-collapsible, sealing membrane 100 depicted in conjunction with an article of rotary shaft equipment such as a pump, mixer, blender, agitator, compressor, blower, fan, or the like, according to an embodiment of the present disclosure.

As is common for seal assemblies of this type, seal assembly 10 can seal a rotating, axially extending, shaft 12 of an article of rotary shaft equipment. Seal assembly 10 can provide a seal for the process chamber 14 at the inboard extent of the seal assembly 10 with respect to the ambient surroundings 16.

The seal assembly 10 can be arranged coaxial of the shaft 12 in a bore defined by an annular housing 18 coaxial of shaft 12. Various stationary (or non-rotating) components of seal assembly 10 can be operably coupled to housing 18, or a gland plate 20, which is in turn also operably coupled to housing 18.

Various rotating components can be operably coupled to shaft 12, for rotation therewith. An annular sleeve member 22 is secured to the shaft 12 for rotation therewith. An annular flange formation 26 extends radially outwardly of the sleeve member 22 at the end thereof adjacent the process chamber 14. A plurality of annularly spaced pins 24 can extend axially through bores in sleeve flange 26.

An axially fixed seal ring 30 (or mating ring) is mounted on the face of sleeve flange 26 remote from the process chamber 14, for rotation therewith. Annular o-ring 32 provides a resilient secondary seal between sleeve member 22 and axially fixed seal ring 30. In embodiments, more or fewer secondary sealing o-rings may be present. Axially fixed seal ring 30 includes outboard sealing face 50.

An axially shiftable seal ring 36 (or primary ring) is arranged outboard and adjacent to axially fixed seal ring 30. Axially shiftable seal ring 36 includes inboard sealing face 52. Inboard sealing face 52 abuts outboard sealing face 50.

While, as depicted and described, axially shiftable seal ring 36 is stationary and axially fixed seal ring 30 is rotatable, in embodiments, the relative axial movement can be provided by either the rotating or stationary seal ring.

Inlet 40 can be defined within housing 18 and/or gland plate 20 to provide a sealing lubricant (not shown) to sealing faces 50 and 52.

Annular bellows, or sealing membrane 100 can present a generally L-shaped cross-section, comprising a first, generally radially outward extending, flange portion 102 and a second, generally axially outboard extending, coaxial portion 104. Flange portion 102 and coaxial portion 104 can be operably coupled by a flexible connecting portion 106. An inboard face of flange portion 102 can abut outboard face of axially shiftable seal ring 36, creating a pressure tight seal. Coaxial portion 104 is substantially or entirely radially inward of the balance diameter of the seal, where the pressure differential across the seal is the greatest. Flexible connecting portion 106 can present an angular facet 108 at a radially inward side and a connecting angle θ between flange portion 102 and coaxial portion 104 at a radially outward side. In embodiments, angle θ can be approximately ninety degrees, though other angles may also be used. Flexible connecting portion 106 can present a thinner cross section than flange portion 102 or coaxial portion 104 to enable stretching and compression.

Angular facet 108 can terminate at corner 110 at a radially inward extent of flexible connecting portion 106. Facet 108 can present an angle φ relative to the axial axis of between about 100° to about 150°. Sealing ember 100 is non-collapsible and can comprise a flexible material. Example flexible materials include elastomers such as nitrile, flurorelastomer, and ethylene propylene rubbers, though other materials can be used.

Coaxial portion 104 is fixed to an annular stub sleeve 200 by annular band 300. The stub sleeve 200 has a first outer diameter D1, a second outer diameter D2 and an angled surface 112 connecting the first outer diameter to the second outer diameter. D2 is greater than D1. Radially outward directed faces (D1, angled surface 112 and D2) of stub sleeve 200 can abut coaxial portion 104, facet 108, and axially shiftable seal ring 36, respectively. Stub sleeve 200 can present groove 202 to receive snap ring 204 to locate stub sleeve axially relative to carrier 504 (discussed below). In embodiments, stub sleeve 200 can be located radially by snap ring 204, hydraulic pressure, or interference fit with carrier 504 (discussed below) or other components of seal assembly 10. Stub sleeve 200, band 300, and snap ring 204 can comprise steel or stainless steel in embodiments.

Annular anti-extrusion ring 400 can be present in an annular groove of axially shiftable seal ring 36 and abut axially shiftable seal ring 36, stub sleeve 200, and sealing member 100. Annular anti-extrusion ring 400 can comprise a harder elastomer than sealing membrane 100, such as a 50 to 55 (Shore D) durometer carbon filled polytetrafluoroethylene (PTFE). Because extrusion is most likely at the balance diameter of the seal, the inner diameter of anti-extrusion ring 400 can be arranged at the balance diameter of the seal.

Biasing mechanism 500 can abut flange portion 102. Biasing mechanism 500 can comprise an axially shiftable annular retainer 502, axially fixed carrier 504, and one or more biasing members 506 spanning therebetween. Retainer 502 can be arranged proximate flange portion 102. Retainer 504 can present protrusion 508, extending axially inboard outside the outer diameter of flange portion 102. Protrusion 508 can be radially spaced from the outer face of flange portion 102. Carrier 504 can be axially and rotationally fixed to gland plate 20 by one or more pins 510, though other fixation mechanisms can be used. Biasing members 506 can comprise one or more radially spaced springs, though other biasing mechanisms known in the art can be used. In embodiments, one or both of retainer 502 and carrier 504 can include bores adapted to house at least part of each biasing member 506, such that biasing members 506 are partially located within retainer 502 and carrier 504.

Those of ordinary skill in the art will appreciate that the arrangements depicted in FIGS. 2 and 3 include components that may be altered or eliminated in other seal assembly embodiments. In addition more or fewer components may be incorporated in other embodiments of seal assemblies according to the present disclosure.

In operation, rotation of shaft 12 can drive sleeve member 22 and axially fixed seal ring 30 to rotate relative to axially shiftable seal ring 36. Seal lubricant (not shown) can be provided to seal 10 through one or more inlets provided in housing 18 to lubricate seal sealing faces 50 and 52 and to create a pressure gradient across sealing faces 50 and 52.

The pressure gradient and hydraulic pressure created by the relative rotation of sealing faces 50 and 52 can resulting in an opening force, urging axially shiftable seal ring 36 axially outboard from axially fixed seal ring 30. Similarly, a closing force can be provided by biasing mechanism 500, urging axially shiftable seal ring 36 inboard toward axially fixed seal ring 30.

Those of ordinary skill in the art will appreciate that the closing force at a seal face interface can be calculated from the closing area (AC), the opening area (AO), the outer diameter of the stationary ring face (OD), the inner diameter of the stationary ring face (ID) and the balance diameter (BD), as detailed below:

$$\text{Closing Force} = \left(\frac{AC}{AO}\right) \times \text{Hydraulic Pressure}$$

where $$AC = \frac{OD^2 - BD^2}{OD^2 - ID^2}$$

Flange portion 102 can shift axially and radially based on the relative closing and opening forces, and the axial translation of the shaft itself, such that the closing force applied to axially shiftable seal ring 36 is constant, regardless of the position of flange portion 102.

Figure 4A:
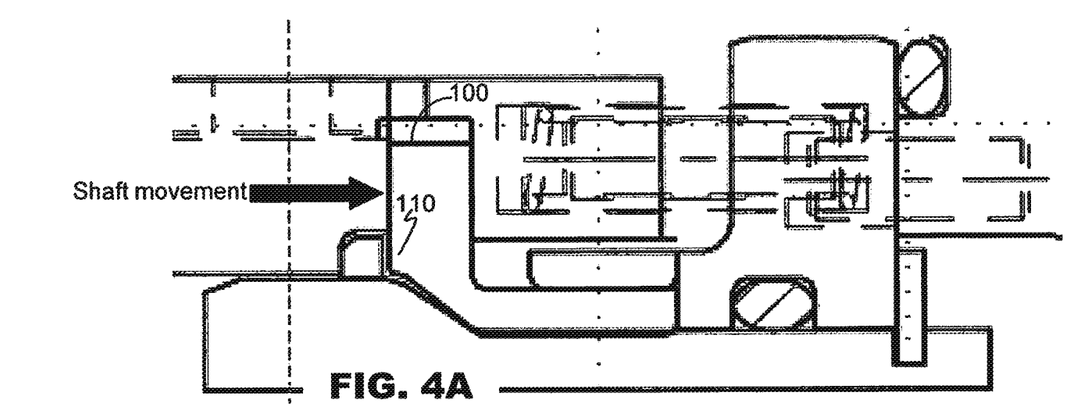
FIG. 4A is a cross-sectional view depicting a portion of a seal assembly according to an embodiment.
Figure 4B:
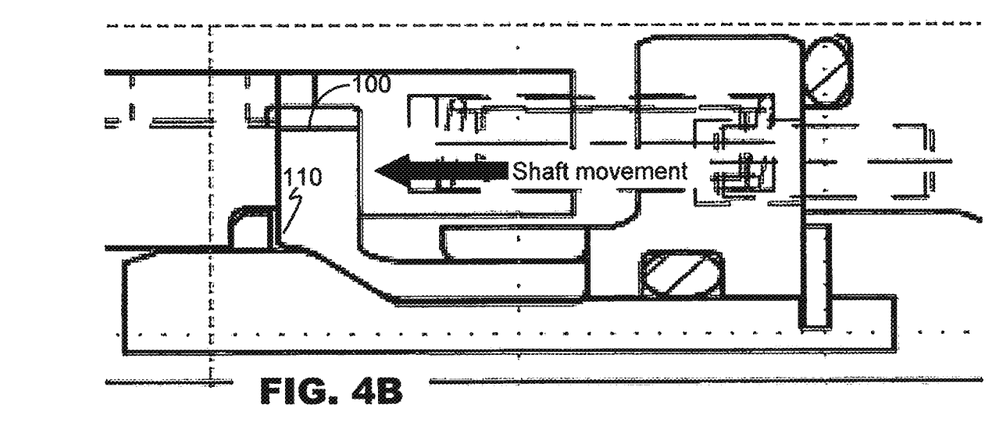
FIG. 4B is a cross-sectional view depicting a portion of a seal assembly according to an embodiment.

FIGS. 4A and 4B are detail views of an embodiment of a seal assembly, in which some effects of axial movement on sealing membrane 100 can be seen. An axially outward translation of the shaft can be transmitted to flange portion 102 via sleeve 22, axially fixed ring 30, and axially shiftable seal ring 36. This movement can cause flange portion 102 to compress slightly and distort at an angle, preventing any changes in the opening and closing forces at the seal interface. In particular, as depicted, axially outboard translation of axially shiftable seal ring 36 can transmit the opening force to flange portion 102, causing flange portion 102 to be translated axially outboard and radially outward away from stub sleeve 200 as depicted in FIG. 4A. Conversely, an axially inward translation of the shaft can relieve pressure on flange portion 102, enabling flange portion 102 to translate axially inboard and radially inward against stub sleeve 200. This contact between sealing membrane and stub sleeve 200 can further minimize leakage.

A high pressure gradient across sealing faces 50 and 52 can encourage partial extrusion of flexible sealing membrane 100 between stub sleeve 200 and axially shiftable seal ring 36. This can be resisted by the harder material of anti-extrusion ring 400.

Over the life of the seal, sealing faces 50 and 52 will wear relative to each other. Because sealing membrane 100 can move inboard, toward process chamber 14, and outward, away from process chamber 14, over the life of the seal, it can help to maintain an appropriate seal gap. Hydraulic pressure can keep the axially shiftable seal ring 36 from contacting axially fixed seal ring 30 while the flange portion 102 of sealing membrane 100 moves inboard. The hydraulic pressure can keep the other components, such as stub sleeve 200, in place. Further, because coaxial portion 104 is below the balance diameter of the seal, the hydraulic pressure applied to coaxial portion 104 will not affect the closing force, or the balance diameter itself. Biasing mechanism 500 can be used to set the working height of the seal and compress flange portion 102 of sealing membrane 100 against an end of the axially shiftable seal ring 36 (distal in relation to the process chamber, and opposite sealing face 52) of the axially shiftable seal ring 36 (creating a seal) when no hydraulic pressure is present. Because the vertical force is not altered by the axial movement of sealing membrane 100, and the closing force at the interface of sealing faces 50 and 52 is not affected.

The maximum axially outboard translation of flange portion 102 and retainer 502 can be defined by a gap provided between an outboard face of retainer 502 and an inboard face of carrier 504, or by the compression limit of biasing members 506. In embodiments, translation of flange portion 102 can be limited to prevent bunching, folding over, or other collapsing of sealing member 100 at connecting portion 106. In one embodiment, translation of flange portion 102 can be limited to maintain angles θ or φ.

In addition, because flange portion 102 is held in a radially extending orientation by axially shiftable seal ring 36 and retainer 502, coaxial portion 104 is held in an axially extending orientation by stub sleeve 200 and band 300, sealing member 100 is non-collapsible.

Figure 5:
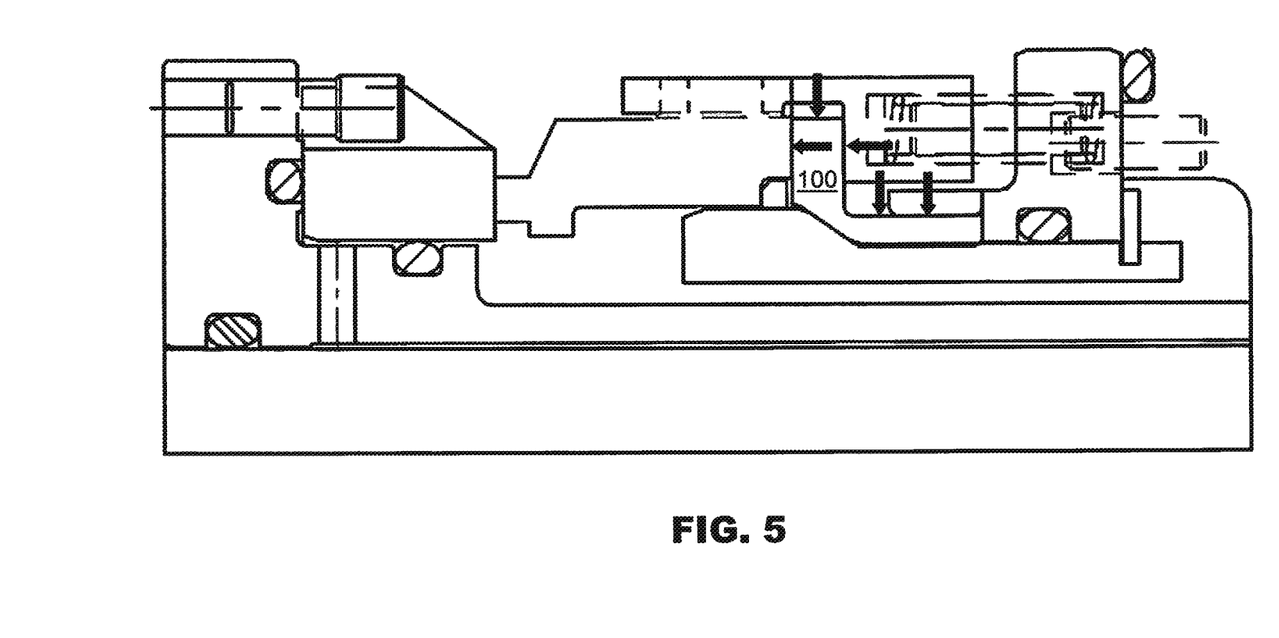
FIG. 5 is a cross-sectional view depicting a portion of a seal assembly according to an embodiment.

As can be seen in FIG. 5, the angle θ between flange portion 102 and coaxial portion 104 of sealing membrane 100 provides for directional control of the forces acting on stub sleeve 200 and axially shiftable seal ring 36. Coaxial portion 104 allows flexibility of flange portion 102 and connecting portion 106 while flange portion 102 is under pressure at the balance diameter of the seal.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. A mechanical seal assembly adapted for arrangement around a rotating shaft, the mechanical seal assembly having a first and a second seal ring, the first seal ring axially shiftable relative to the rotating shaft and the second seal ring axially fixed relative to the rotating shaft, the mechanical seal assembly presenting a balance diameter and comprising:

a gland plate;
a stub sleeve connected to the gland plate, the axially shiftable first seal ring proximate and axially shiftable relative to the stub sleeve and gland plate in response to axial movement of the rotating shaft and axially fixed second seal ring, the axially shiftable first seal ring having an axially shiftable seal face that interfaces with an axially fixed seal face of the axially fixed second seal ring, the stub sleeve including a first outer diameter, a second outer diameter and an angled surface connecting the first outer diameter to the second outer diameter, wherein the second outer diameter is greater than the first outer diameter;
a biasing mechanism that urges the axially shiftable first seal ring toward the axially fixed second seal ring to engage the axially shiftable seal face to the axially fixed seal face with a closing force;
an annular flexible sealing membrane comprising—
a flange portion arrangable between the axially shiftable first seal ring and the biasing mechanism, the flange portion being axially shiftable relative to the rotating shaft by forces transmitted to the flange portion by the biasing mechanism and the axially shiftable first seal ring;
a flexible connection portion positioned within a radially inward extent of the flange portion;
a coaxial portion extending axially from the flexible connection portion, the coaxial portion held axially fixed relative to the stub sleeve by an annular band at an outer diameter and the stub sleeve at an inner diameter;
wherein the coaxial portion is positioned radially inward of the balance diameter of the mechanical seal assembly;
wherein the flexible connection portion includes an angular facet that extends from the flange portion in an axial outward direction and that forms an angle φ with the coaxial portion, wherein the angle φ is between 100° and 150°;
wherein the first outer diameter of the stub sleeve abuts the coaxial portion, the angled surface abuts the angular facet of the flexible connection portion, and the second outer diameter abuts the axially shiftable first seal ring.

2. The mechanical seal assembly of claim 1, wherein axial translation of the rotating shaft relative to the biasing mechanism urges the flange portion to shift axially inboard and radially inward relative to the coaxial portion.

3. The mechanical seal assembly of claim 1, wherein axial translation of the rotating shaft relative to the biasing mechanism urges the flange portion to shift axially outboard and radially outward relative to the coaxial portion.

4. The mechanical seal assembly of claim 1, wherein the connecting portion presents a thinner cross section than the flange portion and the coaxial portion.

5. The mechanical seal assembly of claim 1, further comprising an anti-extrusion ring receivable within a groove of the axially shiftable first seal ring, the anti-extrusion ring positioned at the balance diameter.

6. The mechanical seal assembly of claim 1, wherein the stub sleeve is axially fixed to the biasing mechanism by a snap ring.

7. The mechanical seal assembly of claim 1, wherein the biasing mechanism comprises an axially shiftable annular retainer proximate the flange portion, an annular carrier, axially fixed to a gland plate, and a plurality of radially spaced spring members arranged between the carrier and the retainer.

8. The mechanical seal assembly of claim 1, further comprising a rotating sleeve operably coupled to the rotating shaft for rotation therewith and wherein the axially fixed second seal ring is operably coupled to the sleeve by a plurality of pins.

9. The mechanical seal assembly of claim 5, wherein the sealing membrane comprises a flexible elastomer.

10. A mechanical seal assembly adapted for arrangement around a rotating shaft, the mechanical seal assembly presenting a balance diameter, and having a first and a second seal ring, the first seal ring axially shiftable relative to the rotating shaft and the second seal ring axially fixed relative to the rotating shaft, the mechanical seal assembly comprising:
- a gland plate;
- a stub sleeve connected to the gland plate, the axially shiftable first seal ring proximate and axially shiftable relative to the stub sleeve and gland plate in response to axial movement of the rotating shaft and axially fixed second seal ring, the axially shiftable first seal ring having an axially shiftable seal face that interfaces with an axially fixed seal face of the axially fixed second seal ring, the stub sleeve including a first outer diameter, a second outer diameter and an angled surface connecting the first outer diameter to the second outer diameter, wherein the second outer diameter is greater than the first outer diameter;
- a biasing mechanism that urges the axially shiftable first seal ring toward the axially fixed second seal ring to engage the axially shiftable seal face to the axially fixed seal face with a closing force; and
- an annular flexible sealing membrane comprising—
  - a flange portion arrangable between the axially shiftable first seal ring and the biasing mechanism, the flange portion being axially shiftable relative to the rotating shaft by forces transmitted to the flange portion by the biasing mechanism and the axially shiftable first seal ring,
  - a flexible connection portion positioned within a radially inward extent of the flange portion, and
  - a coaxial portion extending axially from the flexible connection portion, the coaxial portion held axially fixed relative to the stub sleeve by an annular band at an outer diameter and arranged radially inward of the balance diameter of the mechanical seal assembly and the stub sleeve at an inner diameter;
  - wherein the flexible connection portion includes an angular facet that extends from the flexible portion in an axial outward direction and that forms an angle φ with the coaxial portion, wherein the angle φ is between 100° and 150°; and
  - wherein the first outer diameter of stub sleeve abuts the coaxial portion, the angled surface about the the angular facet of the flexible connection portion, and the second outer diameter abuts the axially shiftable first seal ring.

11. The mechanical seal assembly of claim 1, wherein the closing force applied to the axially shiftable first seal ring by the flange portion is not altered by the axial position of the flange portion relative to the rotating shaft.

12. The mechanical seal assembly of claim 9, wherein the anti-extrusion ring comprises an material of a greater hardness than the flexible elastomer of the sealing membrane.

13. The mechanical seal assembly of claim 12, wherein an inner diameter of the anti-extrusion ring is positioned at the balance diameter.

14. The mechanical seal assembly of claim 10, wherein the connecting portion presents a thinner cross section than the flange portion and the coaxial portion.

15. The mechanical seal assembly of claim 10, further comprising an anti-extrusion ring receivable within a groove of the axially shiftable first seal ring, the anti-extrusion ring positioned at the balance diameter.

16. The mechanical seal assembly of claim 15, wherein the sealing membrane comprises a flexible elastomer.

17. The mechanical seal assembly of claim 16, wherein the anti-extrusion ring comprises an material of a greater hardness than the flexible elastomer of the sealing membrane.

18. The mechanical seal assembly of claim 17, wherein an inner diameter of the anti-extrusion ring is positioned at the balance diameter.

19. The mechanical seal assembly of claim 1, wherein the sealing membrane comprises a flexible elastomer.

* * * * *